2,928,754

PRODUCTION OF SOIL-RESISTANT MATERIAL

Joseph W. Schappel, Morton, Pa., assignor to American Viscose Corporation, Philadelphia, Pa., a corporation of Delaware No Drawing. Application December 31, 1956
Serial No. 631,415

18 Claims. (Cl. 106—286)

The present invention relates to improvements in the application of silica to cellulose products and more particularly to the preparation of cellulose fibers such as filaments and staple fibers of viscose rayon having improved resistance to soiling.

It has heretofore been suggested to coat cellulose fibers with deposits of finely divided silica to improve their slip resistance and their resistance to soiling. Also, various procedures have been suggested for the preparation of such silica-coated fibers. For example, the prior art teaches the application of colloidal silica to the exposed pile portion of pile fabrics by spraying, brushing, etc., which results in a coating of the fibers which deteriorates substantially with successive cleaning treatments. Other examples of the prior art which disclose the application of colloidal silica have been exhaustively studied, but have failed to yield teachings which might be followed to obtain sufficient pick-up of silica particles by the fibers to provide satisfactory soil resistance through a service period including a number of cleaning treatments. One of such examples of the prior art discloses the treatment of fibers in a bath containing a cationic surface-active agent and an inorganic salt, and then treatment in a dilute aqueous bath of colloidal silica. Although the cationic material is supposed to promote the deposition of silica on the fiber, and the inorganic salt is present to aid in the deposition of the silica and to promote the fixation thereof, attempts to date to operate this two-bath process in a continuous manner have failed to give fibers loaded with sufficient permanently-fixed silica particles to effect substantial soil resistance even after repeated washings.

Thus, it is a primary object of the present invention to provide silica-coated fibers and a method of producing them, such fibers being characterized by sufficient silica carried thereon to provide outstanding resistance to soiling, and by the improved adherence of the silica material to the fibers. Auxiliary to the foregoing object, it is a further object to provide a method for applying silica to cellulosic fibers in a simple one-step procedure. It is desired moveover, that such procedure be applicable to the manufacturing of the fibers during an early stage thereof. A more specific object is to provide rayon fibers suitable for use in forming the pile or pile fabrics, such as carpets, plushes, and velvets, or the flock of flocked fabrics or other flocked products. Other objects, features and advantages will become apparent from the description of the invention which follows.

These and other objects are obtained by treating the cellulose products with a stabilized colloidal suspension of grown silica particles or aggregates to which, prior to growth, has been added a small amount of a basic aluminum salt and which also contains a small amount of soluble barium.

The aqueous colloidal suspension of grown silica is prepared through the addition of a diluted solution of colloidal silica of substantially smaller particle size to a solution of a basic aluminum salt, such as basic aluminum formate or basic aluminum chloride. On mixing the basic aluminum salt with the silica sol or colloidal solution of silica, an immediate growth or aggregation of the silica occurs to give a colloidal suspension of silica aggregates which are believed to consist of complex micelle of aluminum and silica.

However, the resulting colloidal suspensions in commercial practice, at dilutions of about 0.05 percent to 0.40 percent $SiO_2$, are unstable and the silica precipitates out with the result that substantially less silica is picked up by the treated fibers. This instability is prevented by the inclusion of a small amount of dissolved barium, in the form of a soluble salt, in the colloidal suspension. Since in commercial practice an appreciable amount of sulfate ion is present, either initially in the water or picked up from the "green" cellulose fibers, and will cause precipitation of the barium, sufficient soluble barium salt should be added to still maintain some barium in solution. This unprecipitated barium will hereinafter be referred to as soluble barium.

Treatment of cellulose fibers with colloidal silica suspensions containing small amounts of soluble barium, prepared by adding basic aluminum salts to silica sols in the manner of the present invention, results in the deposition of substantial amounts of silica on the fiber in a closely adherent form which protects the fiber from soiling. Also, the excellent adherence of the silica to the fiber, even after dyeing or repeated washing, assures a protective soil-resistant silica film. In preparing the fiber treating silica suspensions of the present invention, silica sols of almost any smaller particle size may be used including, though not restricted, to sizes of about 1 to 100 millimicrons. For the purpose of practicing the invention, however, the sols generally commercially available are used. These range in average particle size from about 12 to 20 millimicrons.

Colloidal silica products that are commercially available in quantity and are satisfactory for practicing the present invention include such products as "Ludox" (made by E. I. du Pont de Nemours & Co.) and "Syton" (made by Monsanto Chemical Co.). These products are procurable as concentrated dispersions of particle size under 50 millimicrons. Among the preferred silica sols used for practicing the present invention are the "Ludox" colloidal aqueous sols containing about 30 percent colloidal silica of particle sizes in the range of about 15 to 20 millimicrons in diameter, about 0.30 percent sodium oxide and up to about 0.15 percent sodium sulfate. These sols have an approximate pH range of about 8.5 to 10.5.

In practicing the present invention, the basic aluminum salt such as basic aluminum formate $AlOH(COOH)_2$ or basic aluminum chloride $(AlOHCl_2)$, is mixed with the silica sol in amounts such as to give ratios of $Al_2O_3$ to $SiO_2$ of 1:5 to 1:30. The soluble barium salt preferably used in practicing the present invention is barium chloride though other soluble barium salts such as barium nitrate may be used if desired. The barium chloride or other soluble barium salt is added to the solution containing the silica and basic aluminum salt in amounts such as to give about 5 parts per million barium in the final treating solution when diluted to the concentration at which it will be used. If there is present in the water used sulfate or other ion that will precipitate out the barium, the barium chloride should be added in sufficient excess amounts to still give in the solution about 5 parts per million of unprecipitated barium. Although it is recognized that the treating composition of the present invention is not a true solution, particularly with respect to the silica, but rather, a true colloidal suspension of finely divided silica particles or aggregates, for ease of describing the present invention the treating composition will be referred to as a treating solution. Also, all parts and percents given are by weight.

The treating solution can be made up at the concentration at which it is to be used or it may be made up as a more concentrated solution which is then diluted to the desired concentration through the further addition of water. The solution as applied to the cellulose fibers for deposition of silica thereon, should contain 0.1 to 0.4 percent by weight silica, sufficient basic aluminum salt to give a calculated aluminum oxide to silica weight ratio of about 1:5 to 1:30 (equivalent to about 0.033 to 0.20 part by weight $Al_2O_3$ per part by weight silica) and soluble barium, preferably in an amount not less than about 5 parts per million. In the preferred practice the silica content of the treating solution is preferably in the range of about 0.15 to 0.25 percent and the calculated aluminum oxide to silica ratio is in the range of 1:15 to 1:25 (about 0.04 to 0.066 part $Al_2O_3$ per silica). Where the basic aluminum salt is basic aluminum formate, this would require that the basic aluminum formate be added in amounts of 0.053 to 0.08 part by weight per part by weight silica in the preferred practice, and if basic aluminum chloride, in amounts of 0.045 to 0.068 part by weight per part by weight silica. The pH of the silica treating bath lies within an approximate range of about 4.0 to 4.5.

Although concentrations of soluble barium salt sufficient to give soluble barium in amounts up to as much as 200 parts per million may be present in the treating solution, it is generally preferred that the soluble barium content not exceed about 50 parts per million since the presence of too great an amount of soluble barium tends to interfere with the deposition of the silica on the cellulose fibers, thus reducing the amount deposited. However, the presence of the soluble barium appears to have no detrimental effect on the adherence of the silica to the cellulose fiber treated so that a substantial improvement in nonsoiling is still obtained even where the amount of silica held by the fibers is only about 0.3 percent by weight of the coated fiber due to the fact that the deposited silica is firmly anchored to the fiber and not readily removed even by repeated washing.

It has been found that by increasing the temperature of the silica treating solution to about 45° to 50° C., substantially heavier deposits of silica can be obtained on the cellulose fibers than is obtained at room temperatures. In practicing the process of the present invention, it is therefore generally preferred to have the silica treating solution at a temperature of about 40° C. to 50° C. although temperatures as low as 15° C. may be used. Temperatures appreciably in excess of 50° C. however, should be avoided since at the higher temperatures the colloidal silica treating solution becomes unstable with resulting precipitation of the silica prior to deposit on the cellulose fibers. Also, at temperatures much above 50° C. the bath is too hot for ready handling of the yarn in commercial practice.

Although one of the effects of adding the basic aluminum salts to commercial silica sols is to build up the particle size to a size range that appears to be highly beneficial in treating cellulose products, the inclusion of the basic aluminum salt also substantially improves the degree of silica exhaustion onto the cellulose and the adhesion of the silica thereto. Treating cellulose fibers with aqueous silica suspensions in which the silica has been reduced, for example, by grinding, to an equivalent particle size will not give equivalent results even though the suspension has been acidified to a pH of 4.0 to 4.5. The addition of the basic aluminum salt and the presence of the soluble barium is necessary in commercial practice to obtain the excellent exhaustion of silica in the fiber and adhesion between the silica and the cellulose obtained by the process of the present invention. This improved adhesion of the silica deposit and improved exhaustion of the silica onto the cellulose surface combine to give treated cellulose fibers having excellent soil resistant properties which are retained even after dyeing and repeated washings.

For the best results, the fibers should be treated to render them soil-resistant while in the gel or so-called "green state." That is to say, they are thoroughly wetted with the silica solution at a stage in which they have attained a substantially regenerated state after spinning, but before they are dried to a point of equilibrium with atmospheric moisture. By treating in the "green state" a still further improvement in the retention of the silica by the cellulose is obtained. However, even though in preferred practice the regenerated cellulose is treated in the "green state," regenerated cellulose fibers which have been dried, may be rewetted and treated with solutions of the present invention and a substantial improvement in soil resistance still be obtained.

In applying the silica treating solution, the fibers are thoroughly wet with the treating solution for a period of about 2 to 30 minutes. A period of 2 minutes is sufficient for a continuous process although the period may be extended insofar as practical up to 30 minutes to insure the effectiveness of the deposition of silica. Longer periods, though not detrimental, serve no useful purpose. Thereafter, excess suspension is removed from the fibers for example by centrifuging or by passing the fibers between a pair of nip rolls. The fibers may then be dried at any temperature up to about 300° F. Higher drying temperatures should generally be avoided.

In practice of the present invention an initial silica pick-up of about 1 percent, by weight, silica content of the fibers is regarded as generally preferred. At pick-up values of about 2 percent, some silica may tend to dust out of the fibers. This is usually objectionable, though for some purposes pick-up values as high as 3 percent silica may be used. The lower limit of silica for effective improvement in nonsoiling properties is about 0.3 percent. Lower amounts can of course be used but, for the prevention of soiling, are generally not sufficient to give wholly satisfactory results though some protection is obtained. When the fiber is dyed after the silica treatment a reduction in silica content of as much as 50 percent may result. However, this is a substantial improvement in silica retention over the prior art methods noted and still leaves the fibers with sufficient silica to substantially improve their resistance to soiling.

The fibers which acquire silica in accordance with the teaching of this invention will normally require a lubricating-type finish for satisfactory processing into yarns and fabrics. The finish to be applied is preferably nonionic. Examples of such finishes are sorbitol esters of palmitic and lauric acids, sorbitol monopalmitate, sorbitol monolaurate and sorbitan monoleate. These are used in the form of aqueous emulsions together with any suitable emulsifying agent such as polyoxyethylene modified sorbitan tristearate. Such finishes are conventionally applied in aqueous baths containing 0.1 to 2 percent of the finish material. Though the finish ingredients may be incorporated in the silica treating solution, it is preferred to use a separate bath for application of the finishing ingredients after the silica has been applied. This may be, and is preferably, done prior to drying the fibers. In practice it is generally preferred to rinse the fibers after leaving the silica solution and the nip rolls so as to avoid dragging silica solution into the bath containing the finishing ingredients. Where the finishing ingredients are incorporated into the silica solution, there is some tendency to inhibit silica pick-up of the fibers and to render the silica coating less fixed and more subject to loss through laundering.

The following examples will serve to further illustrate the invention:

EXAMPLE I

Fiber treating solutions having different amounts of silica and basic aluminum formate $AlOH(COOH)_2$ were prepared in which the silica content varied from 0.15 to 0.30 percent by weight and the basic aluminum formate varied from 0.001 to 0.026 percent. These solutions were prepared by obtaining a solution of basic aluminum formate having a concentration of 11.9 percent, and then mixing this in varying amounts with Ludox, a silica sol sold by du Pont having a silica content of about 30 percent in a particle size range of about 15 to 20 millimicrons, about 0.30 percent sodium oxide, about 0.15 percent sodium sulfate and a pH of 8.5. The mixing was done by adding a dilute solution of the silica sol, containing 5.15 percent silica, to the solution of basic aluminum formate yielding a 5 percent $SiO_2$ concentrate. The mixed solutions of basic aluminum formate and silica sol were further diluted, to the desired silica content, with Permutit softened water which was pretreated with 0.026 ounce $BaCl_2 \cdot 2H_2O$ per gallon. The Permutit water had an $SO_4$ content of 70 parts per million.

Separate staple masses were treated in each of the solutions. The typical treatment involved circulating the bath through the staple mass for about 10 minutes with the amount of the bath being at least 20 times greater than the amount of fiber by weight. After immersion, the fiber was removed and passed through pinch rolls to remove excess silica solution. The fibers were dried and then washed by immersion at 90° C. for one hour in an Igepon T bath, using a liquor to fiber ratio of 30:1 and 0.1 percent Igepon T based on fiber weight. The fiber was then rinsed in cool water and dried. The fibers were analyzed for $SiO_2$ prior to the silica deposit, after the initial drying and again after washing and drying to determine the silica pick-up and retention after washing. The results are given in the following Table A.

Table A

| Sample | Percent $SiO_2$ | Percent AlOH (COOH)$_2$ | Percent by Weight $SiO_2$ Pick-up | Percent by Weight $SiO_2$ After Washing |
|---|---|---|---|---|
| 1 | .15 | .001 | 1.28 | .67 |
| 2 | .20 | .013 | .88 | .51 |
| 3 | .25 | .016 | .63 | .46 |

EXAMPLE II

Plant water, which on analysis was found to have 70 parts per million $SO_4$ was used to prepare solutions having a 1:20 ratio of $Al_2O_3$:$SiO_2$ and a silica content of about 5.0 percent. These concentrates were stable. However, when diluted to 0.2 percent silica, the silica was found to precipitate out. Further solutions having the same $Al_2O_3$:$SiO_2$ ratio and silica concentration were prepared and barium chloride was added to the water in amounts equivalent to 92, 103, 274, 366, 457, and 550 parts per million above the amount required to cancel out the total sulfate concentration. On dilution to a silica content of 0.2 percent these solutions were found to be quite stable. These solutions were then used to treat 15 denier green staple by immersion at both room temperature (24° C.) and 45° C. The staple was treated by immersion using a liquor to fiber ratio of 20:1, after which it was passed through nip rolls for removing excess silica and dried at 105° C. in a circulating air dryer. The silica treated staple was then dyed by immersion in a cold bath containing 0.1 percent Igepon T and 0.1 percent Brilliant Bengo (Blue 6BH) based on fiber weight and having a liquor to fiber ratio of 25:1. The bath was heated to 95° C. over a period of 30 minutes. The bath was held at 90° for an additional hour with periodic additions of common salt being made in amounts equivalent to a total of 20 percent based on fiber weight. The following Table B gives the pickup and retention of silica obtained, Table B

| P.p.m. Soluble $BaCl_2 \cdot 2H_2O$ | Percent Silica in Fiber Room Temperature Treatment as Treated | Percent Silica on Fiber Treated at 45° C. | | |
|---|---|---|---|---|
| | | As Treated | After Dyeing | Retention, percent |
| 92 | .72 | 1.17 | .69 | 59 |
| 103 | .51 | 1.10 | .65 | 59 |
| 274 | .58 | .82 | .52 | 63 |
| 366 | .50 | .83 | .56 | 67 |
| 457 | .49 | .58 | .40 | 69 |
| 550 | .47 | .51 | .43 | 84 |

EXAMPLE III

A treating solution was prepared in the manner described in Example I having a silica content of 0.18 percent, a basic aluminum formate to silica ratio of 1:25 and a soluble barium content of 20 parts per million. A "green fiber," after thorough rinsing, was then passed through the treating solution at a rate of about one foot per minute equivalent to 6 minutes treating time. After about ½ hour, on analysis, it was noted that the soluble barium content had dropped below 10 parts per million due to water drag-in and dilution, at which time further barium in the form of barium chloride was added to increase the soluble barium content of the solution to about 20 parts per million. The yarn so treated was found to have a silica content of about 1.10 percent by weight and to have a silica content after repeated washing of 0.72 percent by weight. The yarn was also found to have a greatly improved resistance to soiling.

EXAMPLE IV

A solution for applying silica to fibers was prepared by mixing basic aluminum formate, water, and a commercially obtainable colloidal silica solution of which the silica had an average particle size of 18 millimicrons in such proportion as to provide a silica concentration of 0.22 percent and a basic aluminum formate content of 0.016 percent. Barium chloride was added in an amount sufficient to give about 12 parts per million soluble barium. Wet carpet fiber was admitted to a bath of the solution just described in a ratio of 1 part fiber to 25 parts of the bath. The treating temperature was 45° C. After the fiber had been immersed in the bath about 10 minutes, the fibers were squeezed, rinsed in water, and dried at about 100° C. The fibers were analyzed for silica before and after dyeing with the various direct dyes named immediately below.

Percent silica
Silica treated fiber _____ 1.42
Silica treated fibers dyed with Clorantine F (Brown BRL) _____ 0.84
Silica treated fibers dyed with Brilliant Benzo (Blue 6BH) _____ 0.79

In their dried state, the silica-treated fibers of this example showed no tendency to discharge dust.

EXAMPLE V

Fifteen denier bright crimped rayon fibers were treated according to the procedure described in Example I except that various samples of the fibers were treated separately with treating solutions made up in accordance with the concentrations indicated in Table C below. The solution contained 10 parts per million soluble barium chloride.

Table C

| Sample | Percent Silica in Solution | Percent Basic Aluminum Formate in Solution | Percent Silica on the Fibers |
| --- | --- | --- | --- |
| 1 | 0.20 | 0.0105 | 1.21 |
| 2 | 0.20 | 0.0131 | 0.84 |
| 3 | 0.20 | 0.0175 | 0.56 |
| 4 | 0.20 | 0.0260 | 0.35 |

From the data provided, it will be observed that the greatest deposition was obtained in the fiber samples treated with solutions in which the basic aluminum formate content was low relative to the silica content.

EXAMPLE VI

A silica treating solution was prepared at a silica concentration of 0.15 percent and a basic aluminum chloride concentration of 0.013 percent. The solution contained 15 parts per million soluble barium added as barium chloride. This solution was then applied to 15 denier dull crimped viscose staple by showering the solution over the fibers while carried on a conveyor. The solution was stable throughout the process and a sample showed no tendency to settle over a 24-hour period. The application of the solution to the fibers was made at 45° C. and was continued for 10 minutes. The staple fibers were centrifuged and dried at 100° C. Thereafter, the fibers were treated with a lubricating finish comprising a sorbitol fatty acid ester for making the fibers more processable.

The staple fibers were formed into yarn which in turn were made into tufted carpet samples. A carpet sample was dyed in a dye beck in a conventional manner. Analysis of the carpet fiber for silica was made before and after dyeing. The silica values of the carpet were as follows:

|  | Percent |
| --- | --- |
| After opening (by cotton processing) | 0.62 |
| After tufting (carpet sample) | 0.61 |
| After dyeing (carpet sample) | 0.40 |

Samples of carpets comprising silica-treated undyed fibers, silica-treated dyed fibers, and untreated fibers were subjected to a service floor test. Substantial improvement in soil resistance over the carpet sample of untreated fibers was observed in the carpet samples made of silica-treated fibers. The undyed sample having the greater silica content was found to be the least soiled.

EXAMPLE VII

A solution for treating fibers was prepared having a concentration of 0.20 percent of silica and 0.01 percent of basic aluminum formate. The solution also contained 16 parts per million soluble barium added as barium nitrate. The solution was applied in the form of a shower to a blanket of viscose staple fibers continuously for a period of 9 minutes. Staple fibers were centrifuged and dried at 80° C. The fibers were tested in the laboratory along with a control sample for soil retention and found to retain substantially less of the soiling material than the control sample.

EXAMPLE VIII

Fifteen denier crimped rayon fibers were treated in a continuous process by showering the blanket of fibers with a solution containing 0.22 percent silica and 0.011 percent basic aluminum chloride. The solution was prepared with Permutit water pretreated with barium chloride equivalent to 20 parts per million soluble $BaCl_2 \cdot 2H_2O$. The solution was applied at 45° C. for a treating time of 10 minutes. The fibers leaving the silica treatment were rinsed with water and softened with application of a sorbitol fatty acid ester lubricating finish. The treated fibers were dried at 110° C.

Analysis of the fibers showed a silica pick-up of 1.12 percent and upon dyeing with a direct dye, the fiber retained 65 percent of the silica equivalent to 0.73 percent silica.

The silica treating solution was used for 10 hours with no evidence of silica precipitation.

The foregoing examples illustrate the essential features of the invention as well as some of the manners in which the invention may be practiced. Various changes and modifications may be made in practicing the invention without departing from the spirit and scope thereof. For example, mixtures of basic aluminum salts can be used for the purposes of this invention, such as a mixture of basic aluminum formate and basic aluminum chloride. The invention should, therefore, not be limited except as defined in the appended claims.

Having thus described my invention, I claim:

1. A method of improving the soil resistance of regenerated cellulose fibers comprising treating said fibers with a colloidal silica solution containing at least one basic aluminum salt selected from the group consisting of basic aluminum formate and basic aluminum chloride and sufficient barium ions to react with all of the soluble sulfate present in said solution plus an excess of up to 50 parts per million.

2. The method of claim 1 wherein said basic aluminum salt is basic aluminum formate.

3. The method of claim 1 wherein said basic aluminum salt is basic aluminum chloride.

4. The method of improving the soil resistance of regenerated cellulose fibers comprising treating said regenerated cellulose fibers with an aqueous solution containing 0.1 to 0.4 percent silica, sufficient basic aluminum formate to give on a calculated basis about 0.033 to 0.20 part by weight $Al_2O_3$ per part silica, and not appreciably less than about 5 parts per million ionic barium.

5. The method of improving the soil resistance of regenerated cellulose fibers comprising treating said regenerated cellulose fibers with an aqueous solution containing 0.1 to 0.4 percent silica, sufficient basic aluminum chloride to give on a calculated basis about 0.033 to 0.20 part by weight $Al_2O_3$ per part silica, and not appreciably less than about 5 parts per million ionic barium.

6. The method of improving the soil resistance of regenerated cellulose fibers comprising treating said regenerated cellulose fibers with an aqueous colloidal solution containing 0.1 to 0.4 percent by weight of aggregated silica prepared by mixing an aqueous solution of at least one compound of the group consisting of basic aluminum formate and basic aluminum chloride with an aqueous silica sol of substantially smaller particle size in amounts equivalent to 0.033 to 0.20 part by weight $Al_2O_3$ per part by weight silica and sufficient soluble barium salt to have in said aqueous suspension not appreciably less than about 5 parts per million ionic barium.

7. The method of claim 6 wherein the aqueous colloidal solution has a temperature of about 40° to 50° C.

8. The method of claim 6 wherein the aqueous suspension contains 0.15 to 0.25 percent silica and the basic aluminum salt is included in amounts equivalent to about 0.04 to 0.066 part by weight $Al_2O_3$ per part by weight silica.

9. The method of claim 7 wherein the ionic barium does not exceed 200 parts per million of the treating solution.

10. The method of claim 9 wherein the starting silica sol, from which the treating solution is made, has an average silica particle size of about 12 to 20 millimicrons.

11. The method of claim 10 wherein the starting silica sol has an average silica particle size of about 15 to 20 millimicrons, a pH of about 8.5 to 10.5 and contains about 0.30 percent $Na_2O$ and up to about 0.15 percent $Na_2SO_4$.

12. The method of claim 9 wherein the basic aluminum salt is basic aluminum formate.

13. The method of claim 9 wherein the basic aluminum salt is basic aluminum chloride.

14. An aqueous composition for treating regenerated cellulose fibers to improve their soil resistance containing 0.1 to 0.4 percent silica, a basic aluminum salt of the group consisting of basic aluminum formate, basic aluminum chloride and mixtures thereof in amounts sufficient to give on a calculated basis 0.033 to 0.20 parts by weight $Al_2O_3$ per part by weight silica and sufficient barium ions to react with all of the soluble sulfate present in said solution plus an excess of up to 50 parts per million.

15. An aqueous composition for treating regenerated cellulose fibers to improve their soil resistance containing about 0.15 to 0.25 percent by weight silica, 0.053 to 0.08 part by weight basic aluminum formate per part silica, and about 5 to 200 parts per million ionic barium.

16. The composition of claim 15 wherein the ionic barium has been added as barium chloride.

17. A composition for treating regenerated cellulose fibers to improve their soil resistance containing about 0.15 to 0.25 percent by weight silica, 0.045 to 0.068 part by weight basic aluminum chloride per part by weight silica, and 5 to 250 parts per million ionic barium.

18. The composition of claim 17 wherein the ionic barium has been added as barium chloride.

References Cited in the file of this patent

UNITED STATES PATENTS

| Number | Name | Date |
|---|---|---|
| 404,180 | Doremus | May 28, 1889 |
| 2,154,170 | Kramer | Apr. 11, 1939 |
| 2,524,357 | Robey | Oct. 3, 1950 |
| 2,526,684 | Powers | Oct. 24, 1950 |
| 2,622,307 | Cogovan et al. | Dec. 23, 1952 |
| 2,635,056 | Powers | Apr. 14, 1953 |
| 2,657,183 | Beehtold | Oct. 27, 1953 |
| 2,692,838 | Thurber | Oct. 26, 1954 |
| 2,701,218 | Nickerson | Feb. 1, 1955 |
| 2,734,835 | Floria | Feb. 14, 1956 |

OTHER REFERENCES

Uses and Applications of Chemicals and Related Materials," Gregory, vol. II (1944), page 31.